(12) United States Patent
Hashizume et al.

(10) Patent No.: US 6,449,119 B1
(45) Date of Patent: Sep. 10, 2002

(54) HARD DISK DRIVE AND AIR STABILIZING WING FOR USE THEREWITH

(75) Inventors: Masataka Hashizume, Fujisawa; Yoshitaka Kakizaki, Yokohama; Tatsuo Nakamoto, Sagamihara; Kohichi Takeuchi, Yamato, all of (JP)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 09/604,615

(22) Filed: Jun. 27, 2000

(30) Foreign Application Priority Data

Jun. 29, 1999 (JP) .......................................... 11-183049

(51) Int. Cl.$^7$ ................................................ G11B 33/14
(52) U.S. Cl. ...................................................... 360/97.03
(58) Field of Search .......................... 360/97.02, 97.03, 360/97.04, 98.01, 254.7

(56) References Cited

U.S. PATENT DOCUMENTS

| 4,821,130 | A | * | 4/1989 | Bernett et al. | ........... 360/78.04 |
|---|---|---|---|---|---|
| 5,696,649 | A | * | 12/1997 | Boutaghou | ............... 360/97.03 |
| 6,008,966 | A | * | 12/1999 | Forbord et al. | .......... 360/97.03 |
| 6,091,570 | A | * | 7/2000 | Hendriks | ................. 360/97.03 |
| 6,091,576 | A | * | 7/2000 | Eckerd et al. | .............. 360/105 |
| 6,115,214 | A | * | 9/2000 | Allsup et al. | ............ 360/255.2 |
| 6,160,686 | A | * | 12/2000 | Albrecht et al. | ......... 360/255.6 |
| 6,172,843 | B1 | * | 1/2001 | Genheimer et al. | ...... 360/97.01 |
| 6,212,029 | B1 | * | 4/2001 | Fioravanti | ................ 360/97.01 |
| 6,236,531 | B1 | * | 5/2001 | Allsup et al. | ............ 360/97.01 |
| 6,236,532 | B1 | * | 5/2001 | Yanigisawa | .............. 360/97.02 |
| 6,271,987 | B1 | * | 8/2001 | Allsup et al. | ............ 360/97.03 |

FOREIGN PATENT DOCUMENTS

| JP | 58070459 A2 | 4/1983 |
|---|---|---|
| JP | 3083202 A2 | 4/1991 |

* cited by examiner

*Primary Examiner*—Jefferson Evans
(74) *Attorney, Agent, or Firm*—Robert B. Martin

(57) ABSTRACT

A hard disk device with air stabilizing wings which enable the straightening of the airflow between disks and the suppression of the vibration of disks and actuators.

5 Claims, 7 Drawing Sheets

HARD DISK DRIVE AND AIR STABILIZING WING FOR USE THEREWITH

FIELD OF THE INVENTION

The present invention relates to a hard disk device comprising a housing, a plurality of disks which are stacked and rotatably enclosed in the housing, and an actuator having a head on its end for reading and writing data and enclosed in the housing so as to move relative to a surface of the disk, and an air stabilizing wing for use therewith.

BACKGROUND OF THE INVENTION

Conventionally, there are various known configurations for a hard disk device comprising a housing, a plurality of disks which are stacked and rotatably enclosed in the housing, and an actuator having a head on its end for reading and writing data and enclosed in the housing so as to move relative to the surface of the disk. In such a hard disk device with the conventional configuration, when the plurality of disks are rotating at high speed, the actuator forms an obstacle between disks causing turbulence due to the rotation and the obstacle between the disks. The turbulence between disks causes the flight of the head floating above the disk to become unstable.

To solve the problem of unstable flight of the head, attempts have been made to indirectly suppress the disturbance of airflow by changing the head design, the actuator shape, or the disk material. These attempts were insufficient to stabilize the flight of the head. On the other hand, as examples of putting an airflow stabilizing member between disks, it is known to provide a spoiler between disks for preventing fluctuation of the gimbal members due to wind (Published Unexamined Japanese Patent Application No. 58-70459), and providing a straightening vane between disks for straightening the airflow disturbance due to rotation (Published Unexamined Japanese Patent Application No. 3-83202). However, since these approaches are both intended only to prevent vibration of the actuator, they were insufficient to make the head fly stably between disks which is increasingly required at the higher rotation speed achieved in recent years.

It is the object of the present invention to solve the above described problem, and provide (i) a hard disk device in which the airflow between disks can be straightened and the vibration of disks and actuators can be suppressed, and (ii) an air stabilizing wing for use therewith.

SUMMARY OF THE INVENTION

The present invention is directed to a hard disk device, comprising: a housing, a plurality of disks which are stacked and rotatably enclosed in the housing; and an actuator having a head on its end for reading and writing data and enclosed in the housing so as to move relative to a surface of the disk. In this hard disk device, an air stabilizing wing with a streamlined cross section is provided between the disks and in the immediately lower reaches circumferentially at a predetermined distance just after and downstream, in the direction of rotation of the disks than the position where the head on the end of the actuator moves on the disks.

In the present invention, by providing an air stabilizing wing with streamlined cross section between disks, the airflow between disks can be straightened. Further, the vibration of disks can be suppressed by the pressure of the straightened air. Furthermore, by providing the air stabilizing wing in the immediately lower reaches circumferentially at a predetermined distance just after and downstream, in the direction of rotation of the disks than the position where the head on the end of the actuator moves on the disks, the turbulence around the actuator can be suppressed to control the vibration of the actuator.

As a preferred example of the present invention, if the air stabilizing wing is formed removably relative to the housing and it can be attached between disks later, the work for setting the air stabilizing wing between disks is simplified, and the air stabilizing wing can be easily changed. Further, if a plurality of air stabilizing wings are integrally configured with a predetermined distance therebetween, the plurality of air stabilizing wings can be more easily set or changed. When the distance between the head on the end of the actuator and the outer edge of the air stabilizing wing which is opposed to the head is at least 4 mm, (4 mm or larger) though it depends on the size of the hard disk device, the contact between the head and the air stabilizing wing can be eliminated. Also, as to the distance between the air stabilizing wing and the disk, if the distance between the air stabilizing wing at its thickest portion and the disk is at least 0.3 mm, (0.3 mm or larger), though it depends on the size of the hard disk device, the contact between the air stabilizing wing and the disk can be eliminated.

Further, in the present invention, to achieve the above described hard disk device, an air stabilizing wing is employed, in which a plurality of board-shaped members with streamlined cross section are provided upright on a base board so that the streamlined cross section is parallel with the base board. In the air stabilizing wing, the base board is preferably attachable to and detachable from the housing of the hard disk device, and easy placement of the air stabilizing wing in the hard disk device can be performed.

BRIEF DESCRIPTION OF THE DRAWINGS

FIG. 1 is a figure showing the concept of the hard disk device of the present invention, in which

DETAILED DESCRIPTION OF THE INVENTION

Figure 1A:
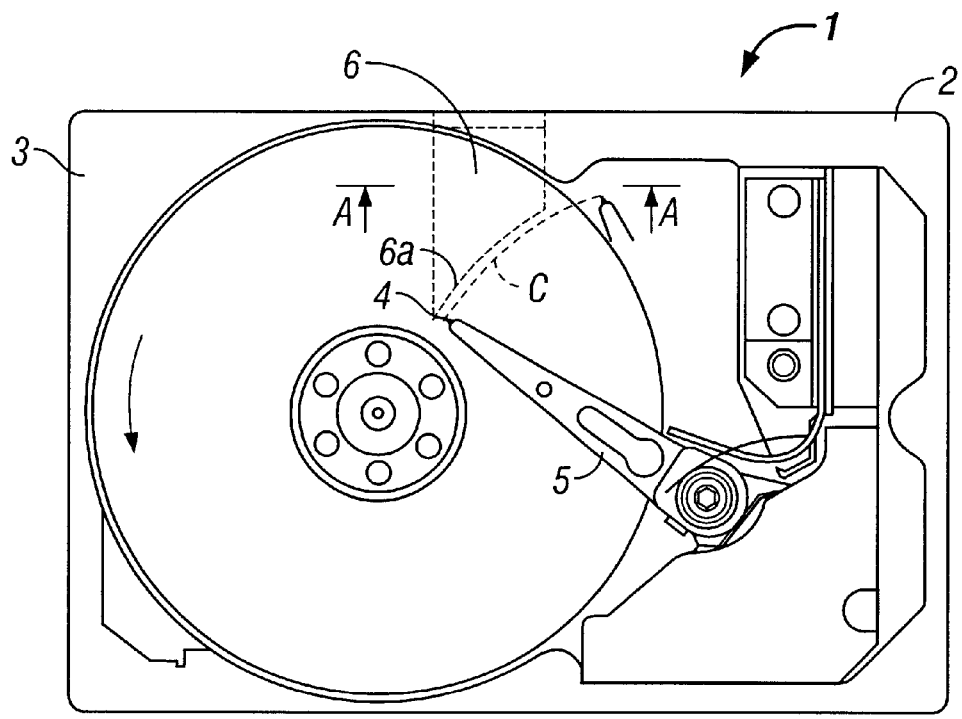
FIG. 1(a) is a plan view of it and FIG. 1(b) is a side view of it.
Figure 1B:
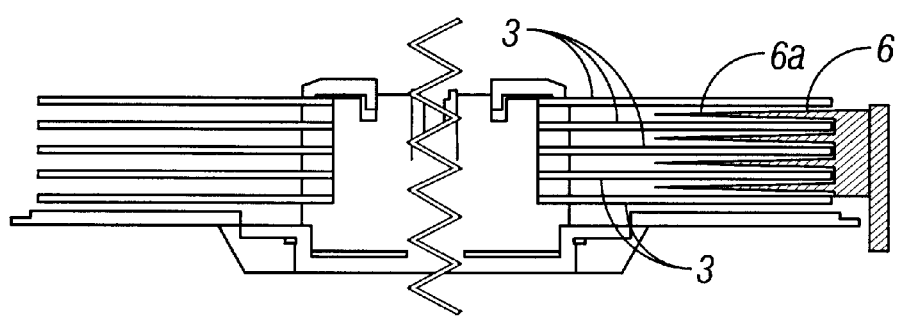

FIG. 1(a) and FIG. 1(b) respectively show the concept of a hard disk device of the present invention, and FIG. 1(a) shows its plan view, while FIG. 1(b) shows its side view. In FIG. 1(a) and FIG. 1(b), the hard disk device 1 of the present invention comprises a housing 2, a plurality of disks 3 which are stacked and rotatably enclosed in the housing 2, an actuator 5 having a head 4 on its end for reading and writing data and enclosed in the housing 2 so as to move relative to the surface of the disks 3, and an air stabilizing wing 6 provided between the disks 3. In FIG. 1(b), the housing 2 and the actuator 5 are omitted for simplification.

The present invention is characterized by providing the air stabilizing wing 6 between the disks 3. The air stabilizing wing 6 is streamlined in the cross section (cross section along the line A—A in FIG. 1(a)). Further, the air stabilizing wing 6 is positioned in the immediately lower reaches circumferentially than the position where the head 4 on the end of the actuator 5 moves on the disks 3 (position indicated by a dashed line C in FIG. 1(a)), a predetermined distance therebetween just after and downstream, in the direction of rotation of the disks 3. As a preferred example of the predetermined distance, the distance between the head 4 on the end of the actuator 5 and the outer edge 6a of the air stabilizing wing 6 which is opposed to the head 4 on the end of the actuator 5 (predetermined distance) is 4 mm or larger. This is to completely avoid the contact between the head 4 and the outer edge 6a. Further, the air stabilizing wing 6 is removable from the housing 2, and configured so as to be later attached between the disks 3, as described later. Furthermore, the distance between the air stabilizing wing 6 and the disks 3 is 0.3 mm or larger to completely avoid the contact between the air stabilizing wing 6 and the disks 3.

Figure 2:
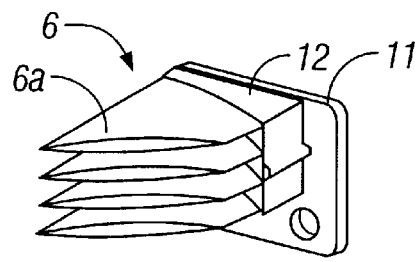
FIG. 2 is a perspective view showing an exemplary configuration of the air stabilizing wing for use with the hard disk device of the present invention.

FIG. 2 is a perspective view showing an example of the air stabilizing wing 6 for use with the hard disk device of the present invention. In FIG. 2, a plurality of air stabilizing wings 6 (in this example, four) are integrated on a base board 11 so that they are provided upright with their streamlined cross section being parallel. Further, in the example shown in FIG. 2, there is provided, between the base board 11 and the air stabilizing wing 6, an intermediate member 12 which forms part of the wall of the housing when it is set. The outer edge 6a of the air stabilizing wing 6 is cut away in an arc according to the locus along which the head 4 of the actuator 5 moves, as described above. A mounting hole provided in the base board 11, which is used for the setting it in the housing 2.

Figure 3A:
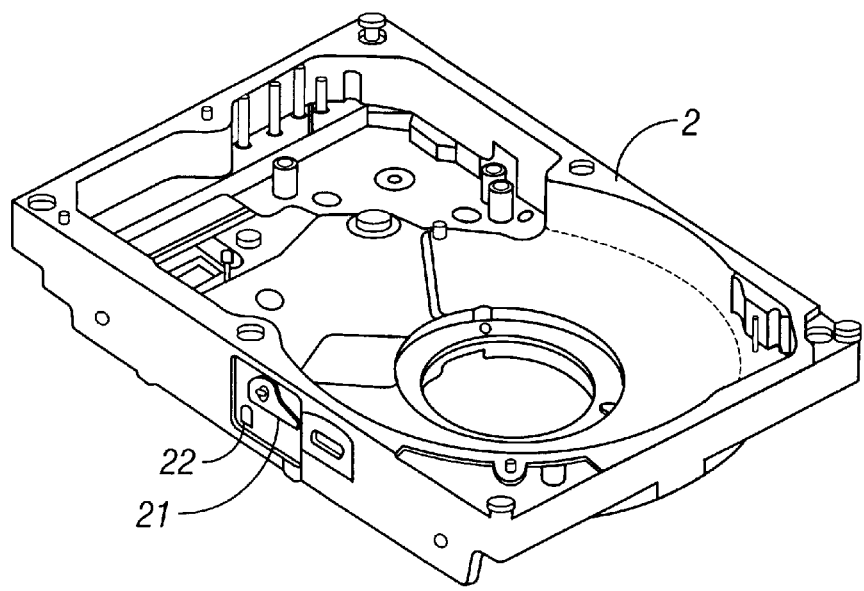
FIG. 3(a) and FIG. 3(b) are perspective views respectively showing a housing machined for the air stabilizing wing, as seen from different directions.
Figure 3B:
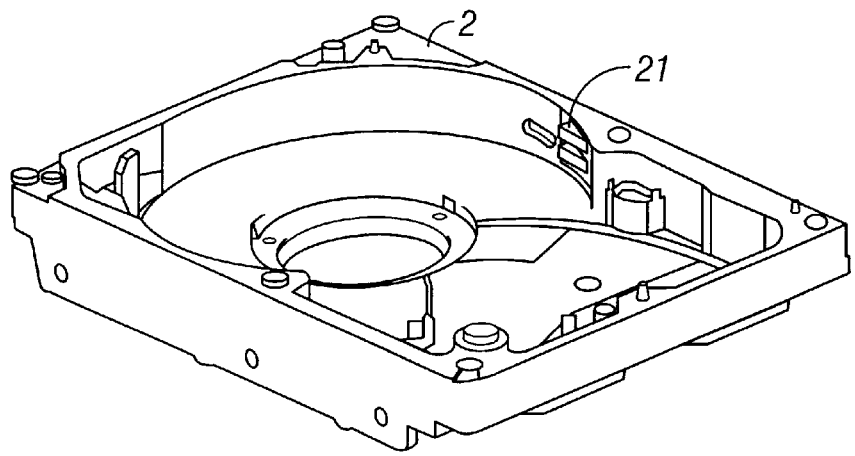
Figure 4A:
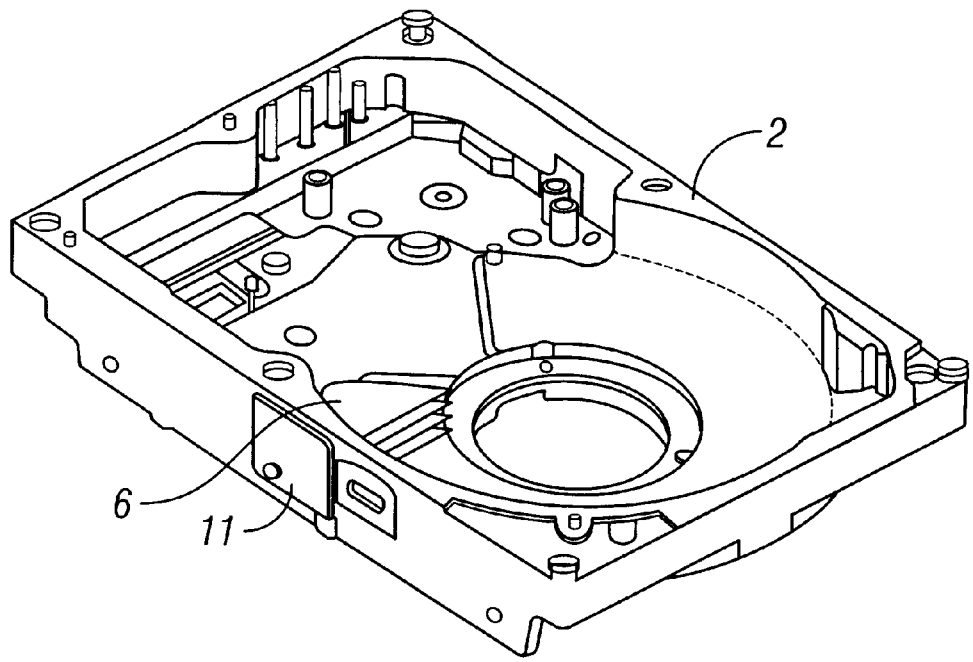
FIG. 4(a) and FIG. 4(b) are perspective views respectively showing the housing in which the air stabilizing wing is set, as seen from different directions.
Figure 4B:
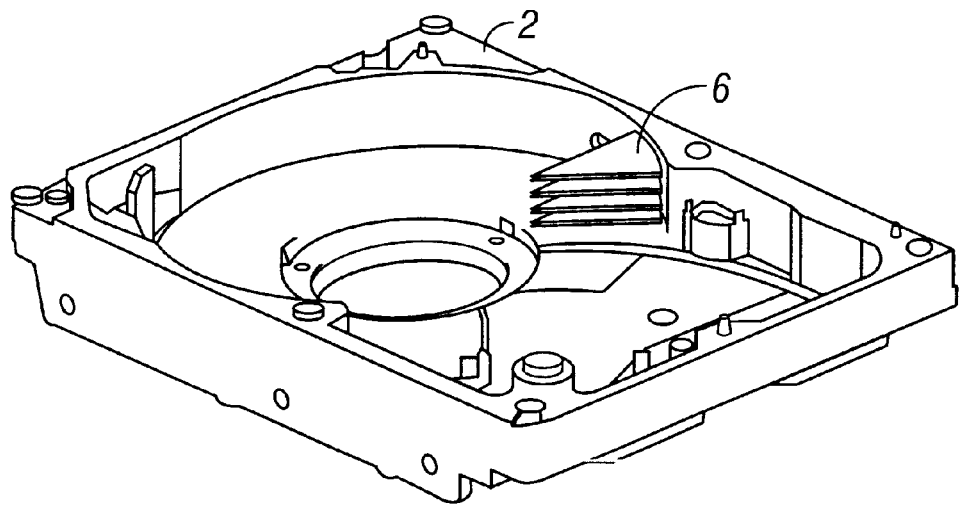

FIG. 3(a) and FIG. 3(b) are perspective views showing the housing 2 machined for the air stabilizing wing 6, as seen from different directions. FIG. 4(a) and FIG. 4(b) are perspective views respectively showing the housing 2 with the air stabilizing wing 6, as seen from different directions. As shown in FIG. 3(a) and FIG. 3(b), an opening 21 for setting the air stabilizing wing 6 is formed in the side of the housing 2, and a screw-threaded mounting hole 22 is provided in the opening 21. The air stabilizing wing 6 is set in the housing 2 by threading a bolt through a mounting hole 13 provided in the base board and tightening. Thus, the air stabilizing wing 6 can easily be set after assembling the hard disk device 1, and it can also easily be changed.

In the above described hard disk device 1 of the present invention and the air stabilizing wing 6 for use therewith, the air stabilizing wing 6 with streamlined cross section is provided between the disks 3, so that, in the streamlined portion (both sides of which are shaped in a knife edge), air enters from one knife-edged portion and exits from the other knife-edged portion, whereby the airflow between the disks 3 can be straightened. Further, since the air stabilizing wing 6 is streamlined in the cross section, the vibration of the disks 3 can be suppressed by the pressure of the straightened air. Furthermore, since the air stabilizing wing is provided just after and downstream, (in the direction of disk rotation), of the position where the head on the end of the actuator 5 moves, the turbulence around the actuator 5 can be suppressed to control the vibration of the actuator 5.

To examine the effect of the present invention, comparisons were made (i) between the state of the head in the hard disk device of the present invention actually having an air stabilizing wing and the state of the head in the conventional hard disk device having no air stabilizing wing, (ii) between the vibration of the actuator in the hard disk device of the present invention having an air stabilizing wing and the vibration of the actuator in the conventional hard disk device having no air stabilizing wing, and (iii) between the hard disk device of the present invention having an air stabilizing wing and the conventional hard disk device having air stabilizing wing of a different shape. The results are described below.

(1) Comparison between the state of the head in the hard disk device of the present invention having an air stabilizing wing and the state of the head in the conventional hard disk device having no air stabilizing wing:

Four hard disk devices having an air stabilizing wing (each ten heads) were prepared, and the effect of the air stabilizing wing by the head position was evaluated by comparing the performance increase rates of RRO (Repeatable Runout), Msigma, and Sigma for the case in which the head is located on the outer periphery of the disk (OD), the case in which the head is located on the middle portion (MD), and the case in which the head is located on the inner periphery of the disk (ID).

Figure 5:
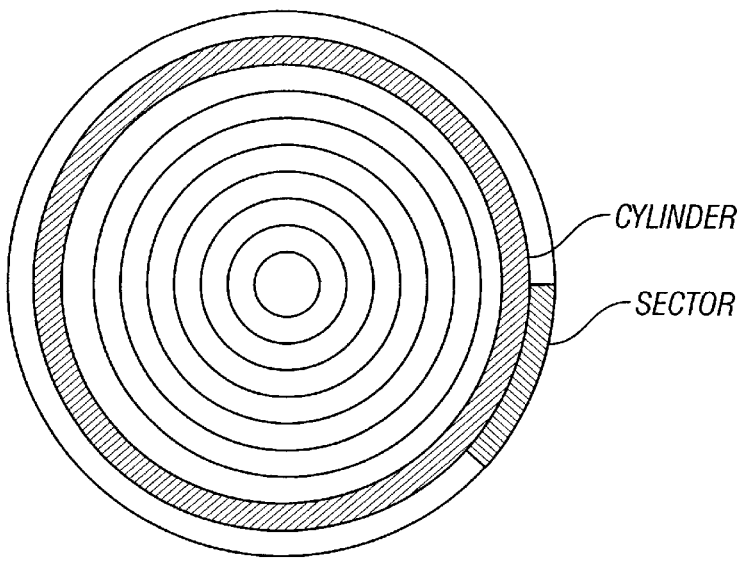
FIG. 5 is a figure showing an example of the configuration of a disk.

Sigma, Msigma, and RRO are as follows. As in an example of the disk shown in FIG. 5, in the typical hard disk device, the disk is stored for each sector, and one circle of sectors is called a cylinder. Referring to FIG. 5, first, Sigma means the standard deviation of the position of the head (positional offset from the center of the cylinder). That is, the standard deviation of head positions for the number of measurements x the number of sectors. From the meaning of the expression, Sigma represents the degree of fluctuation of the head in a certain cylinder. Then, Msigma is calculated as the standard deviation of the position of the head in each sector. Assuming that there are N sectors and the standard deviation of the position of the head in a sector i is Msigma (i), it is defined that Msigma=(Msigma (1)+ . . . +Msigma (N))/N. From this, Msigma represents the nonreproducible fluctuation degree of the head in a certain cylinder. Finally, RRO is defined by $RRO^2 = Sigma^2 - Msigma^2$. From this expression, RRO represents the reproducible degree of fluctuation of the head in a certain cylinder. This is indicated as always having a similar vibration level at a certain frequency if the fluctuation is analyzed by vibration frequency. Further, the performance increase rate as the evaluation index was obtained by giving, by unit of (%), the rate of performance increase of each measured value in the hard disk device of the present invention having an air stabilizing wing for each measured value in the conventional hard disk device having no air stabilizing wing.

Figure 6:
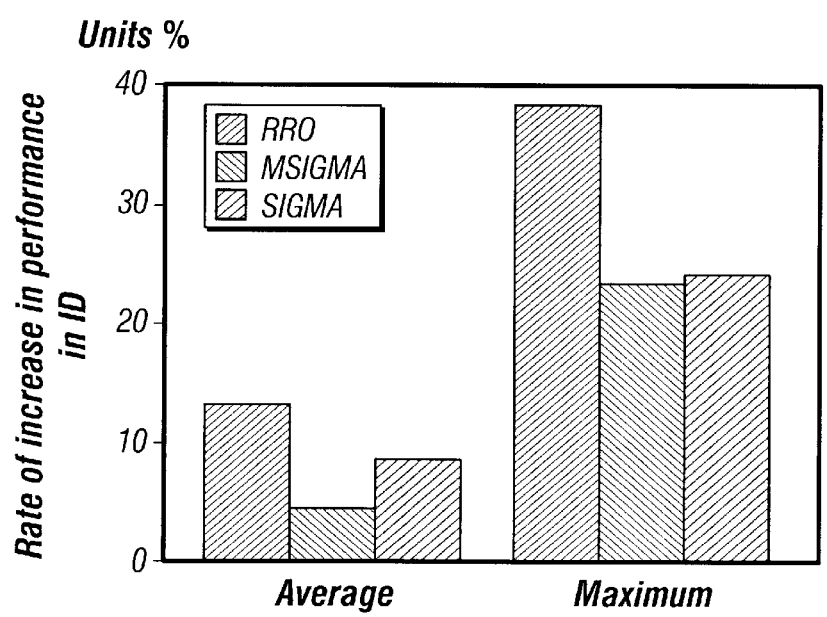
FIG. 6 is a graph showing the increase in performance of RRO, Msigma, and Sigma in the outer periphery portion.
Figure 7:
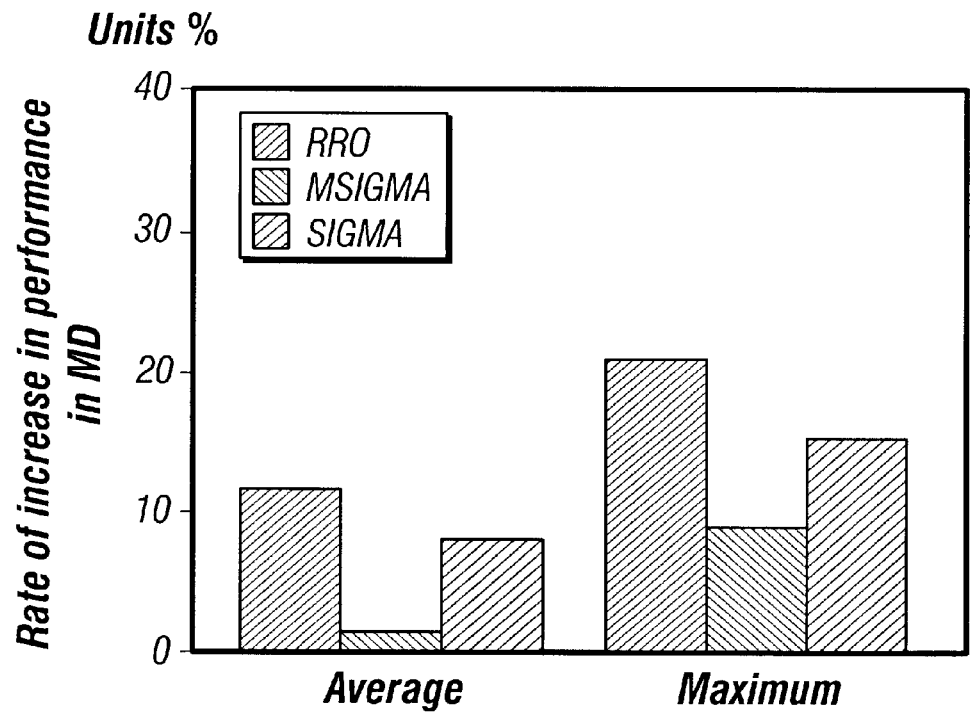
FIG. 7 is a graph showing the increase in performance of RRO, Msigma, and Sigma in the middle portion.
Figure 8:
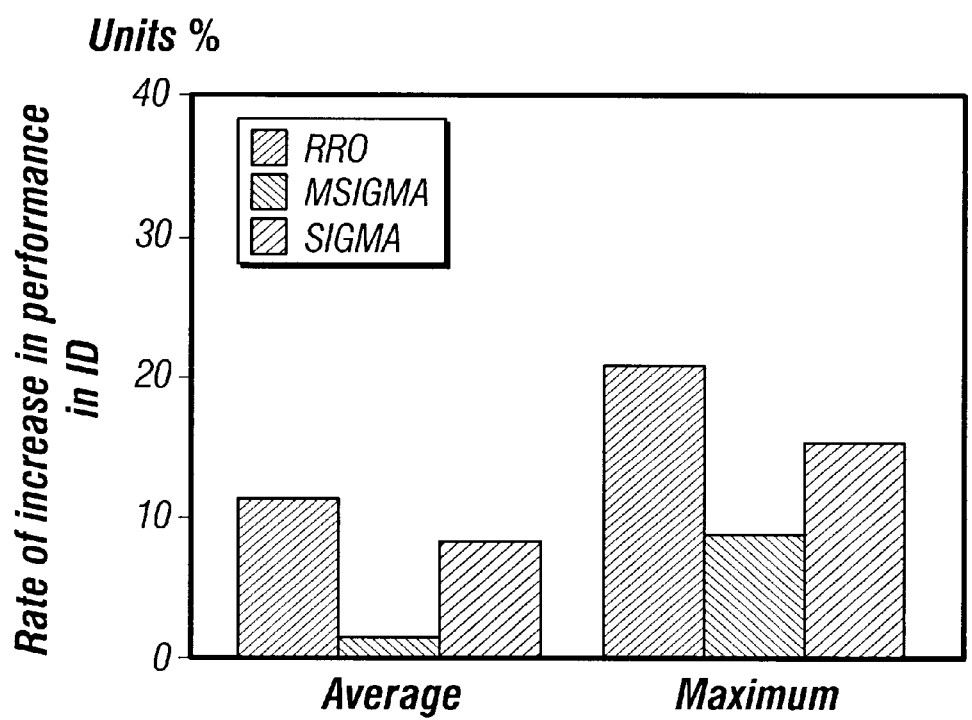
FIG. 8 is a graph showing the increase in performance of RRO, Msigma, and Sigma in the inner portion.

The measurement results in the outer periphery portion (OD) is shown in FIG. 6, the measurement result in the middle portion (MD) is shown in FIG. 7, and the measurement result in the. inner peripheral portion (ID) is shown in FIG. 8. The results in FIGS. 6 to 8 show that the performance increases in any of the outer periphery portion, middle portion, and inner periphery portion, and that the effect of airflow on the head can be reduced in any portion. Further, since the increase in performance is significant particularly in the outer periphery portion, it is seen that the air stabilizing wing is largely effective in the outer periphery portion where the head is considered to be most susceptible to the effect of airflow.

Figure 9:
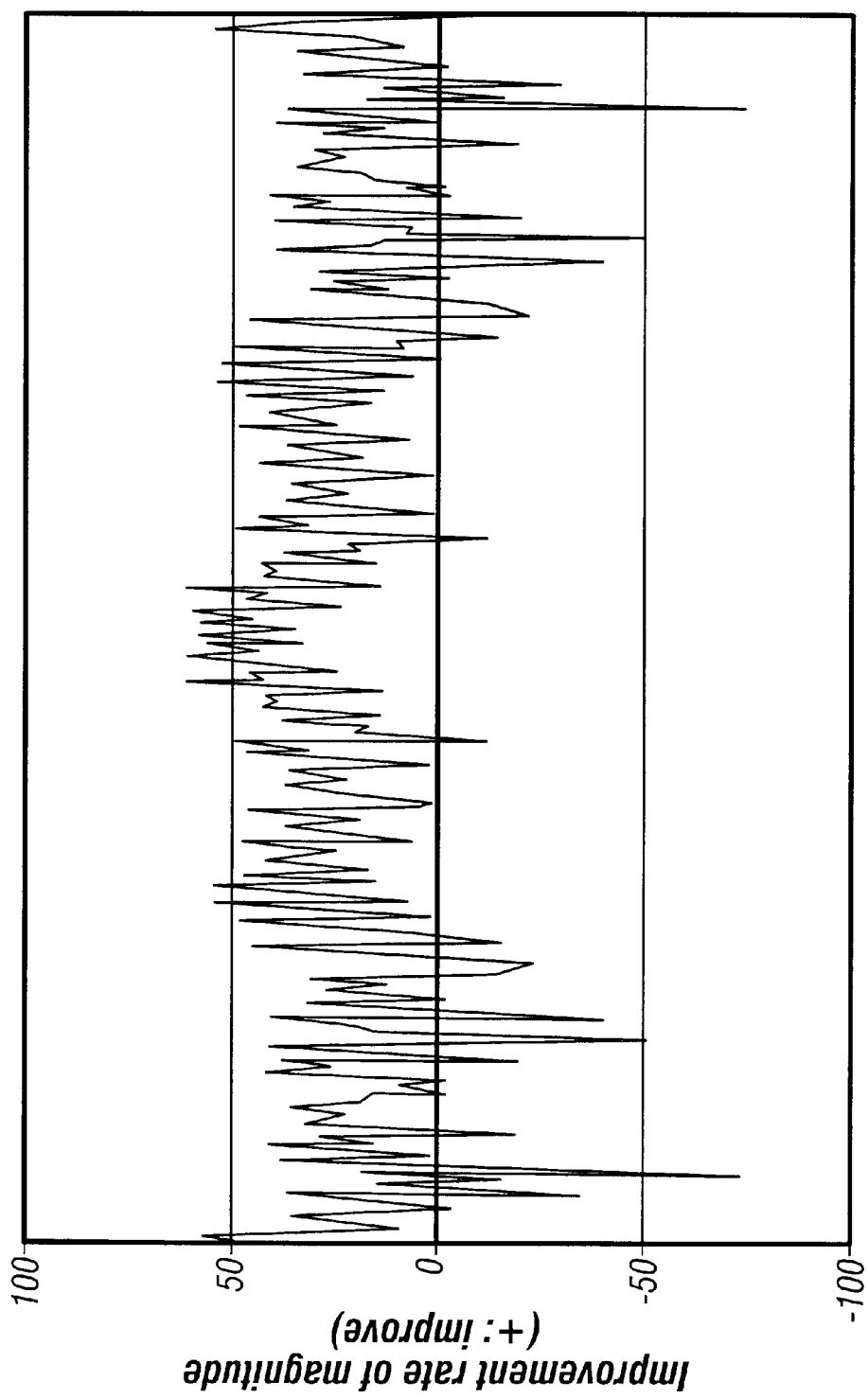
FIG. 9 is a graph showing the relation between frequency and a predetermined rate of increase in magnitude for evaluating the vibration level of the actuator.

(2) Comparison between the vibration of the actuator in the hard disk device of the present invention having an air stabilizing wing and the vibration of the actuator in the conventional hard disk device having no air stabilizing wing:

In the hard disk device of the present invention having an air stabilizing wing and the conventional hard disk device having no air stabilizing wing, the vibration levels of the respective actuators were measured, and assuming that the improvement rate of vibration level is 100–W(n)/D(n)100 for each frequency, where W(n) is the vibration level in the hard disk device of the present invention having an air stabilizing wing and D(n) is the vibration level in the conventional hard disk device having no air stabilizing wing, an evaluation was given. The result is shown in FIG. 9. The result in FIG. 9 shows that the improvement rate becomes largely plus for almost every frequency, and that the air stabilizing wing is effective in reducing the vibration of the actuator.

Figure 10:
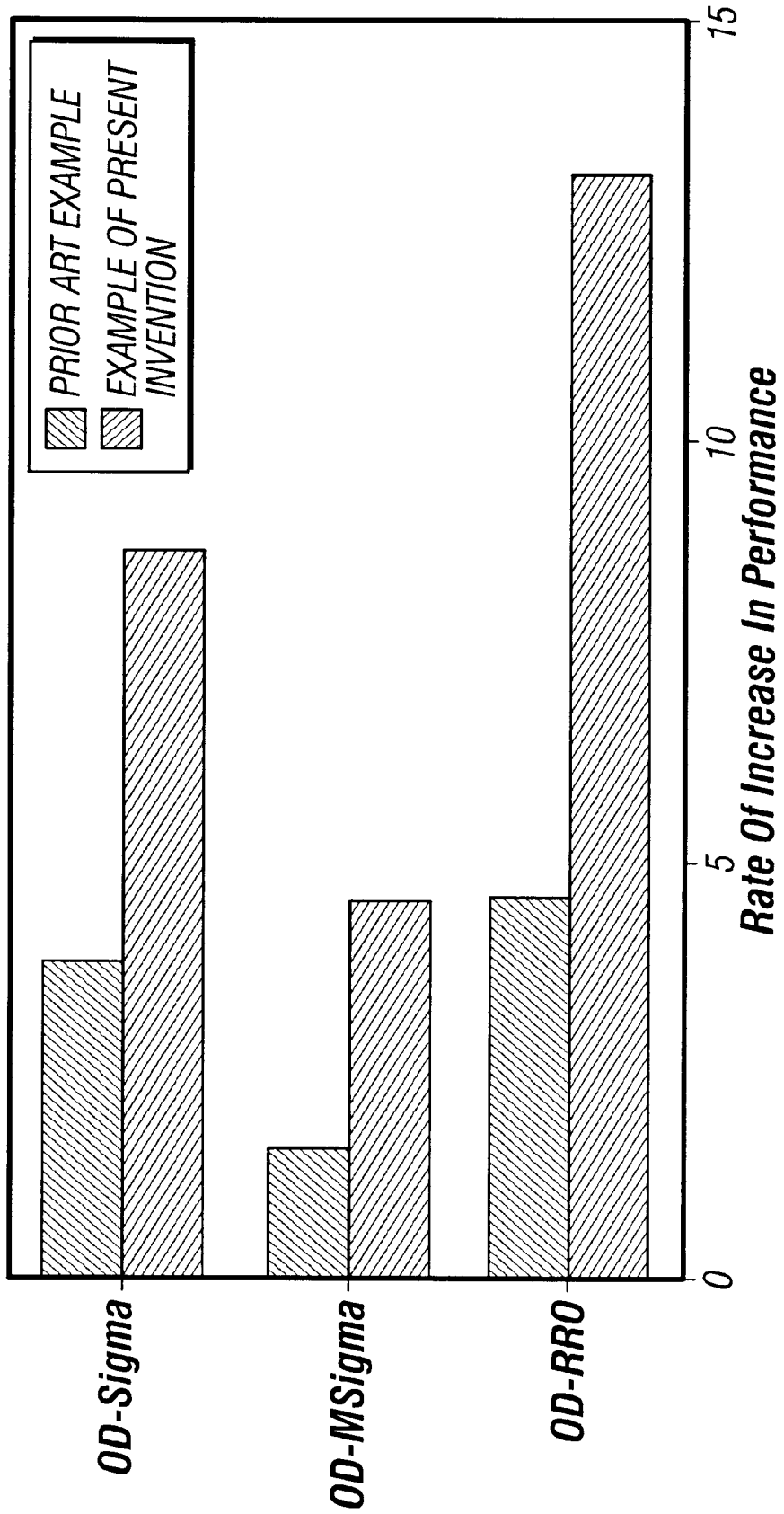
FIG. 10 is a graph for evaluating the shape of the air stabilizing wing, which shows the rate of increase in performance of RRO, Msigma, and Sigma in the outer periphery portion for the air stabilizing wing with streamlined cross section and the flat air stabilizing wing with square cross section.

Comparison between the hard disk device of the present invention having an air stabilizing wing and the conventional hard disk device having an air stabilizing wing of a different shape:

In the hard disk device of the present invention having an air stabilizing wing with streamlined cross section and the conventional hard disk device having a flat air stabilizing wing with square cross section, the above described Sigma, Msigma, and RRO were measured in the outer periphery portion (OD) of the respective disks, and the rate of increase in performance for those values in the hard disk device having no air stabilizing wing was obtained. The result is shown in FIG. 10. The result in FIG. 10 proves that, even in examples in which an air stabilizing wing is provided, the increase in performance largely depends on the shape of the cross section, and the fluctuation of disks cannot be fully suppressed by wings other than the air stabilizing wing with streamlined cross section as in the present invention.

In accordance with the present invention, an air stabilizing wing with streamlined cross section is provided between disks to straighten airflow between the disks. Further, the vibration of disks can be suppressed by the pressure of the straightened air. Furthermore, since the air stabilizing wing is positioned just after and downstream, in the direction of rotation of disks, of the position where the head on the end of the actuator moves on disks, a predetermined distance therebetween, the turbulence around the actuator can be suppressed to control the vibration of the actuator.

We claim:

1. A hard disk device, comprising:

a housing;

a plurality of disks which are stacked and rotatably enclosed in the housing;

a rotable actuator having a head on its end for reading and writing data enclosed in the housing and movable relative to a surface of said disks, and an air stabilizing wing for stabilizing the disks during rotation with a streamlined cross section and an arc shaped edge permanently positioned between the disks so that the arc shaped edge faces the actuator and is spaced apart from the head end of the actuator at a predetermined distance downstream, in the direction of rotation of the disks from the position of the head on the end of said actuator.

2. The hard disk device according to claim 1, wherein said air stabilizing wing is configured so as to be attachable to and detachable from said housing with the disks.

3. The hard disk device according to claim 1, wherein both sides of the air stabilizing wing are shaped in a knife edge.

4. The hard disk device according to claim 1, wherein the distance between the head and the edge of said air stabilizing wing opposed to the head is 4 mm or larger.

5. The hard disk device according to claim 1, wherein the distance between the air stabilizing wing and the disk is 0.3 mm or larger.

* * * * *